No. 682,589. Patented Sept. 10, 1901.
E. H. GIESY.
REFRIGERATOR.
(Application filed Apr. 14, 1897.)

(No Model.) 6 Sheets—Sheet 1.

Witnesses
Charles H. Spiegel,
K. Smith

Inventor
Edward H. Giesy
per
Wm. Hubbell Fisher,
Attorney.

No. 682,589. Patented Sept. 10, 1901.
E. H. GIESY.
REFRIGERATOR.
(Application filed Apr. 14, 1897.)

(No Model.) 6 Sheets—Sheet 4.

Witnesses
Raymond Ratliff
K. Smith

Inventor
Edward H. Giesy
per Wm. Hubbell Fisher,
Attorney

No. 682,589. Patented Sept. 10, 1901.
E. H. GIESY.
REFRIGERATOR.
(Application filed Apr. 14, 1897.)

(No Model.) 6 Sheets—Sheet 5.

Witnesses
Charles F. Spiegel
K. Smith

Inventor
Edward H. Giesy
per
Wm. Hubbell Fisher
Attorney

THE NORRIS PETERS CO., PHOTO-LITHO., WASHINGTON, D. C.

No. 682,589. Patented Sept. 10, 1901.
E. H. GIESY.
REFRIGERATOR.
(Application filed Apr. 14, 1897.)
(No Model.) 6 Sheets—Sheet 6.

Witnesses
Charles H. Spiegel.
H. Smith

Inventor
Edward H. Giesy
per
Wm. Hubbell Fisher,
Attorney.

UNITED STATES PATENT OFFICE.

EDWARD H. GIESY, OF WYOMING, OHIO, ASSIGNOR TO ALFRED M. STEARNS, OF SAME PLACE, AND HENRY H. GIESY, OF LANCASTER, OHIO.

REFRIGERATOR.

SPECIFICATION forming part of Letters Patent No. 682,589, dated September 10, 1901.

Application filed April 14, 1897. Serial No. 632,124. (No model.)

*To all whom it may concern:*

Be it known that I, EDWARD H. GIESY, a citizen of the United States, and a resident of the village of Wyoming, in the county of Hamilton and State of Ohio, have invented certain new and useful Improvements in Refrigerators, of which the following is a specification.

My invention in general relates to the construction of the provision-compartments and also to the arrangement of flues in connection therewith.

The several features of my invention and the various advantages resulting from their use conjointly or otherwise will be apparent from the following description and claims.

In the accompanying drawings, making a part of this specification, and in which similar letters of reference indicate corresponding parts, Figure 1, Sheet 1, is a vertical transverse central section of the refrigerator, taken from front to rear—viz., in the plane of the dotted line 2 2 of Fig. 3, Sheet 2. Fig. 10 is a view in perspective of one of the crocks B. The opening $B^2$ in the side of the crock will be on that side of the crock which is next to the flue conveying cold air from the ice-chamber above down to said crock B.

A indicates the outer frame and casing of the refrigerator. This casing is preferably lined with a non-conducting substance $A^2$, such as mineral wool. The frame or casing A is preferably formed in a plurality of sections or divisions separable from one another for convenience in handling or setting up the refrigerator and also permitting the capacity of the refrigerator to be varied by omitting or adding one or more sections. In the present case the lower section or division (indicated at $A^3$ on the drawings) comprises two vertical sets or tiers, being arranged side by side and each comprising a lower and an upper compartment. The tiers or sets of compartments are separated by a space or hollow $A^4$, extended vertically at the center of the section, and access may be had to the two compartments of each tier by means of a door $A^5$ at the front of the section, there being such a door for each tier, as clearly shown in Figs. 2 and 16.

The next or middle section $A^6$ of the casing or body is adapted to rest removably upon the lower section $A^3$ and has two provision-compartments, one at each side and separated by a space or hollow $A^7$, extended vertically in the center of the section. When the section $A^6$ is in place on the lower section $A^3$, the respective provision-compartments of the former section are alined vertically with the respective sets or tiers of the latter section and each forms the third compartment in one of such tiers or sets. The space or hollow $A^7$ is also alined with the space $A^4$ of the lower section. Doors $A^8$ are provided in the section $A^6$, affording access to its provision-compartments.

The upper or ice division or section $A^9$ rests upon the section $A^6$ and is formed with a single ice-compartment D, having a door $A^{10}$ at the front of the section. The ice-compartment D has a lining of zinc or other metal.

As herein shown, the several provision-compartments of the two lower sections or divisions $A^3$ and $A^6$ are each formed of crocks or linings B and C, made from vitrified material, preferably covered on their interior surfaces with a glaze, so that they may be easily cleansed. These crocks are formed with top, bottom, side, and back walls, forming the top, bottom, side, and back walls of the provision-compartments; but their fronts are open to permit access to the compartments when the doors of the casing are opened.

Various modifications may be made in the arrangement of the crocks. For example, instead of providing the lower section $A^3$ with two crocks B and C at each side one or both of its tiers or sets of compartments may be replaced by a single large compartment having a single crock or vitrified lining B, as shown clearly in Fig. 10, Sheet 4.

The crocks or linings B and C are so set in the respective sections $A^3$ and $A^6$ that their front edges are spaced apart from the front walls of the sections and from the doors thereof to produce between said edges and walls of the sections corresponding spaces in which are formed vertical flues or passageways F in both sections, adapted to convey rising air upward. These flues have independent connection with each compartment through the open front of the crock or lining thereof. A vertical partition $F^2$ is extended across the space between the linings and the front walls of the sections in front of the central spaces $A^4$ and $A^7$ of the sections, so that a separate flue F is formed for each tier or set of provision-compartments. By this means odors arising from food in a compartment at one side of the casing cannot affect food placed in a compartment at the other side thereof.

Figure 3:
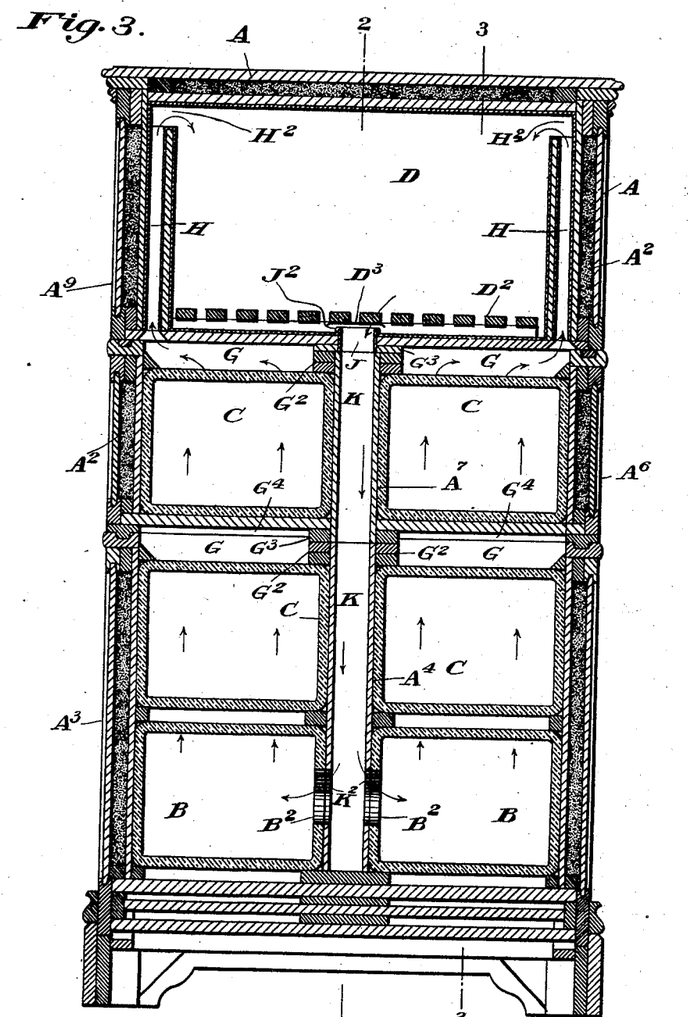
Fig. 3, Sheet 2, is a vertical section of the refrigerator, taken in a plane at right angles to the plane in which the section of Fig. 1 was taken, this section, Fig. 3, being taken in the plane of the dotted lines 4 4 of Fig. 1.

At the top of each section $A^3$ and $A^6$ of the casing is formed an air-space G, extended across the tops of the provision-compartments therein and with which the flues F are adapted for communication, as shown in Fig. 3. Each space G has its roof formed by the superimposed section of the casing and is divided into two parts by a central partition $G^2$, arranged over the central space or hollow of the section and extended horizontally from the upper end of partition $F^2$ to the back wall of the casing.

As herein shown, the under sides of the middle section $A^6$ and of the top section $A^9$ are formed with recesses $G^4$, extended across them and forming the upper parts of the air-spaces G when the sections are assembled, and these recesses $G^4$ are crossed and divided centrally by cleats $G^3$, corresponding with and adapted to fit flush on the partition $G^2$, by which the air-spaces G are divided.

Figures 8, 11:
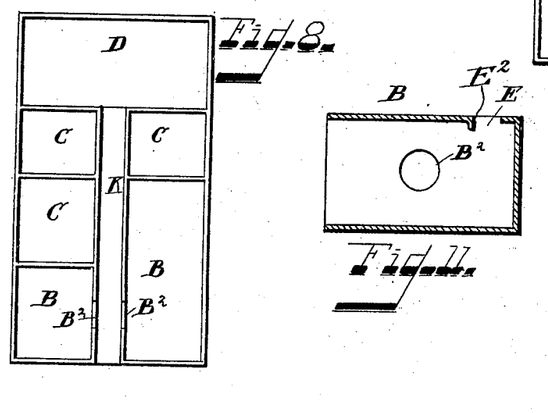
Fig. 8, Sheet 4, is a diagraphic view showing a mode of arranging the compartments, the view being a vertical section taken from side to side.
Fig. 11 is a vertical central section of a crock, illustrating a part of my invention.
Figure 9:
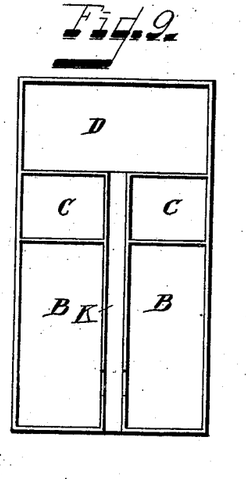
Fig. 9 is a view similar to that of Fig. 8, but showing another mode of arranging the compartments.
Figure 10:
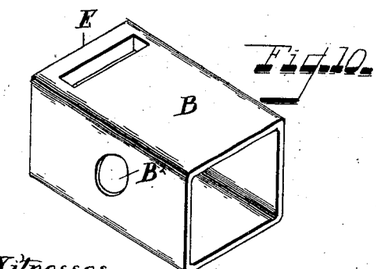

Each of the lower crocks or linings B is provided in its top or roof with an opening E of elongated form, as clearly shown in Figs. 10 and 11, said opening being located just in advance of the closed back wall of the crock or lining and serving as a flue for the upward passage of air from the crock. Each crock or lining C has a like opening E both in its top and bottom and in alinement with the opening of the lower crock for the passage through it of air rising from the crock B below. The openings E in the tops of crocks C communicate with the air-spaces G at the tops of the sections $A^3$ and $A^6$, as clearly shown in Figs. 3 and 12, and the several openings E of each tier of provision-compartments form flues for rising air, extending up just in advance of the rear wall of the casing of the refrigerator. The inner surface of each of the crocks or linings is also provided with a ledge or bead $E^2$, extended along the front side of each opening E therein and raised above the surface of the wall in which said opening is formed, so as to be adapted by engagement with a dish or the like placed in the compartment to prevent such dish or other article from being pushed back far enough to close the opening E or interfere with the passage of air through the same. The ledges or beads $E^2$ being extended entirely across the crocks also act to prevent liquids spilled in the crocks from dropping through the openings E into the compartments below. By providing both openings E of the upper crocks or linings C with such ledges or beads the upper crocks are made reversible, so that either one of the openings may be uppermost.

Figure 4:
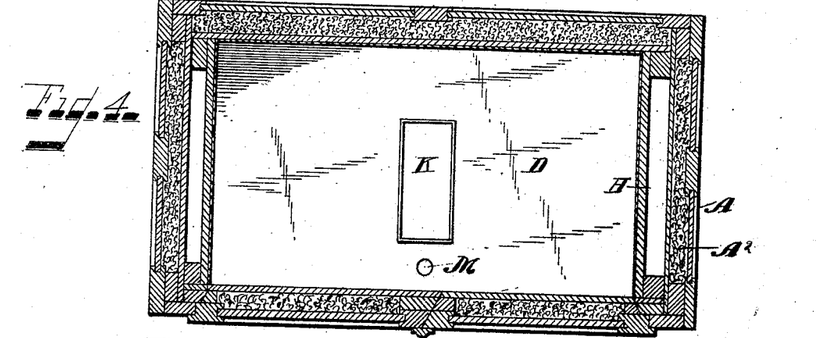
Fig. 4, Sheet 3, is a horizontal section taken in the plane of the dotted line 5 5 of Fig. 1—viz., through the ice-compartment and looking downward.
Figures 13, 14:
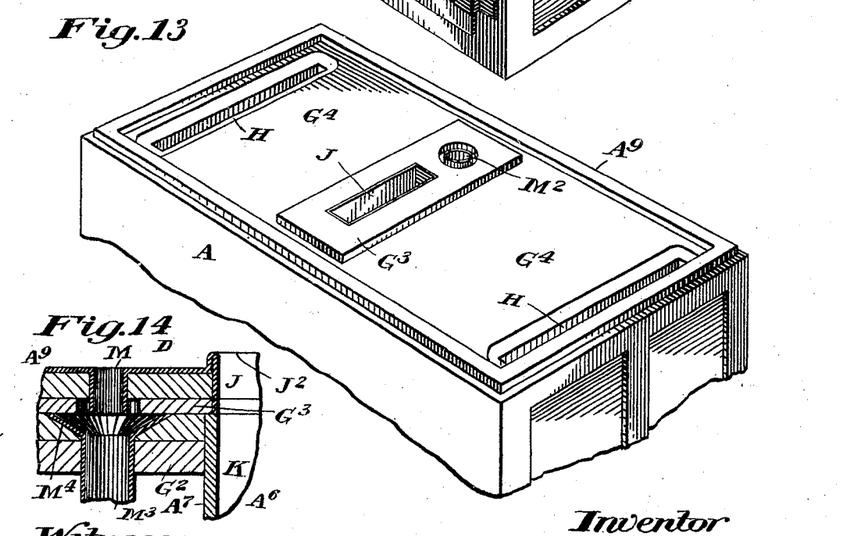
Fig. 13 is a partial perspective view showing the under side of the ice-section of the refrigerator.
Fig. 14 is an enlarged sectional detail view showing the connection between the drip-passages of the ice-section and of the upper provision-section.

The upper section $A^9$ is provided with flues H, connecting its ice-chamber D with the air-space G of the middle section $A^6$, and through said air-space with the two sets of flues for rising air in the provision-sections—namely, the flues F at the front of the casing and the flues formed by the openings E at the rear of the casing. The flues H, as shown in Figs. 3, 4, and 13, are extended vertically at opposite sides of the refrigerator or at the ends of the ice-chamber D and are formed of vertical partitions extended across said ice-chamber from front to rear. The partitions have their upper ends spaced away from the roof of the ice-chamber to form passages $H^2$, by way of which the air rising in the flues H may enter the ice-chamber above the ice therein.

The space G forms a connection between the flues H of the top or ice section and the front and rear flues of the two lower provision-sections, and since each of said two lower sections is provided with such an air-space G at its top it is evident that the middle section $A^6$ may, if desired, be omitted and the top section $A^9$ be set directly on the top of the lower section $A^3$ without in any way interfering with the circulation of air through the flues; but usually and by preference the sections will be all employed.

The bottom or floor of the ice-chamber D is provided with an ice-rack $D^2$, on which the ice is supported therein, and the bottom of said chamber is also provided near its front with a drip-opening M, located centrally of the width of the refrigerator-casing and adapted to carry off the water from the melting ice. Said opening M communicates with a pipe $M^2$, extending to the bottom of the section $A^9$ and in turn adapted to discharge into a pipe $M^3$ of larger diameter held vertically in the front part of the central space $A^7$ of the middle section $A^6$. To insure the discharge of all water from the pipe $M^2$ to pipe $M^3$, the former is made to project slightly beyond the under side of the section $A^9$, and the cleat $G^3$ is perforated at this point in a diameter greater than that of the pipe $M^2$, so as to permit the water to drop freely from the lower edge of said pipe. The upper end of the pipe $M^3$ is made flared, as shown at $M^4$, to receive the water dripping from pipe $M^2$. The lower end of the pipe $M^3$ is also adapted in a similar manner to discharge the water passing through it to the upper end of a pipe $M^5$, held vertically in the lower section $A^3$ in the forward part of the central space $A^4$ thereof.

The bottom of the ice-chamber D is provided with a central opening J for the passage of cold air, the edges of said opening being provided with a raised guard or flange $J^2$ to prevent the escape of water downward. The ice-rack $D^2$ has a metal plate $D^3$, which extends over the opening J to prevent water or ice from falling into said opening. The opening J is extended through the cleat $G^3$ at the bottom of the section $A^9$ and is adapted for communication with a central cold-air flue K, formed partly in each of the two provision-sections $A^6$ and $A^3$, said flue being located in the central spaces $A^7$ and $A^4$ of said sections. The parts of the flue of course register with each other and with the opening J when the several sections are set one on the other.

The flue K extends down between the two tiers or sets of provision-compartments, and at the lower part of the lower section $A^3$ the opposite side walls of said flue are provided with circular openings $K^2$, which correspond with circular openings $B^2$, centrally formed in the adjacent sides of the two lower linings or crocks B B in the section $A^3$. The arrangement of the openings $B^2$ is clearly shown in Fig. 11, and their function is to admit cold air into the two lower compartments from the central flue K to cool and preserve the articles placed in said compartments. The air thus admitted to the lower provision-compartments upon becoming warmed rises and divides, a part passing up through the openings E into and through the superposed linings C and a part flowing forward and rising through the forward flues F. All of the warmed air on rising to the air-space G passes by way of the flues H to the ice-chamber D, in which it descends and is again cooled.

Figure 2:
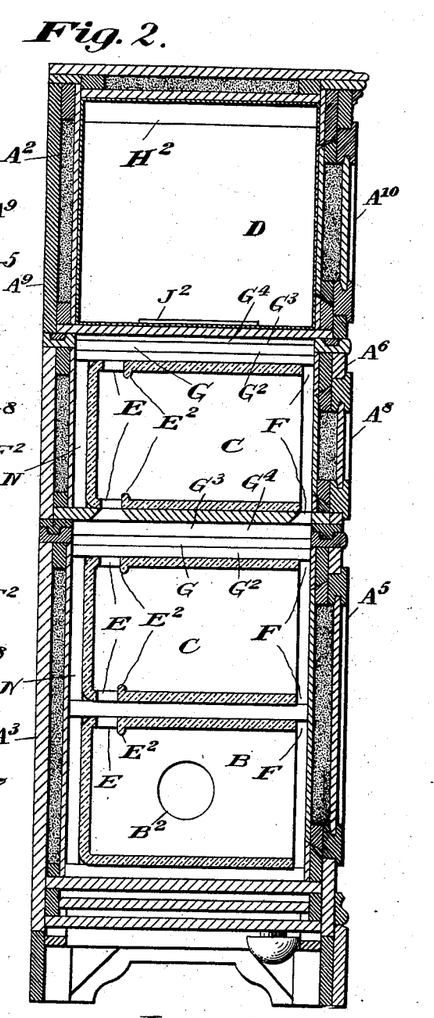
Fig. 2, Sheet 1, represents a vertical section of the refrigerator, taken from front to rear and to one side of the center—to wit, in the plane of the dotted line 3 3 of Fig. 3, Sheet 2. That face of the section is seen which faces toward the left in Fig. 3.
Figure 5:
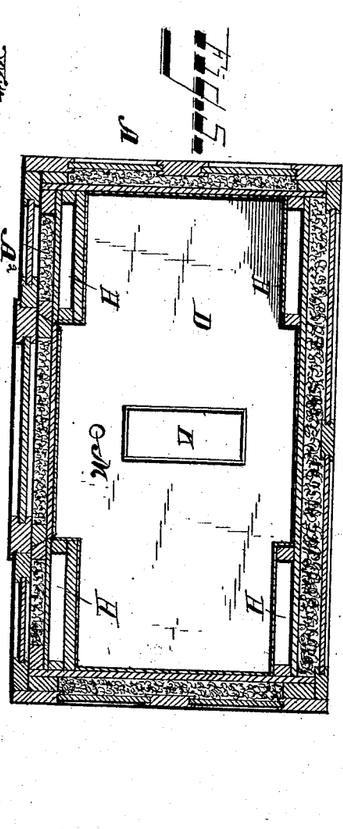
Fig. 5, Sheet 3, is a horizontal section similar to Fig. 4, taken through the ice-compartment and indicating a modification of the construction of the upper part of the flues adjacent to the ice-compartment.
Figure 16:
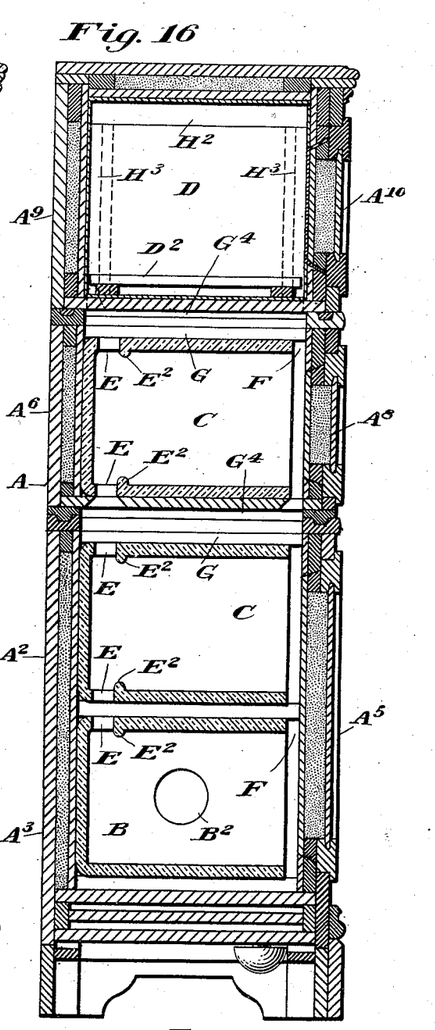
Fig. 16 is a view similar to Fig. 2, but showing a modified form of the refrigerator, in which the linings of the provision-compartments are flush on the back wall of the refrigerator.

As shown in Fig. 2, the crocks or linings are of less dimensions than the interior of the casing and are so arranged that a dead space N is provided behind them; but this space may, if desired, be omitted and the back walls of the crocks or linings be made to fit flush upon the back wall of the casing, as shown in Fig. 16. Also in some cases the flues H at the ends of the ice-chamber D may be omitted and such flues be replaced by flues $H^3$ at front and rear of the casing, as shown in Fig. 5 and in dotted lines in Fig. 16. Where this flue arrangement is employed and the crocks or linings are made to fit flush against the back wall of the casing, the rear flues $H^3$ of the ice-section $A^9$ will correspond with and be in substantial alinement over the flues formed by the opening E of the crocks.

Figure 6:
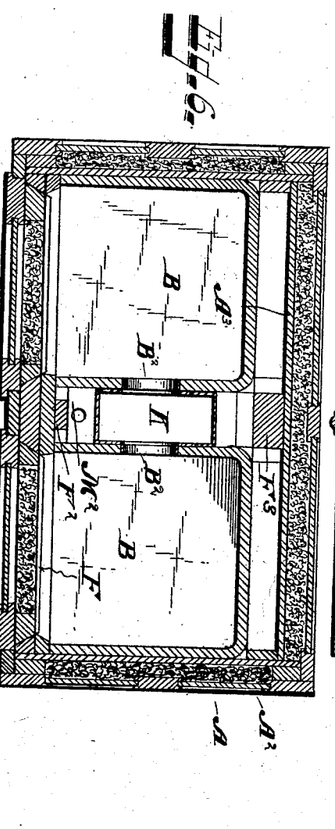
Fig. 6, Sheet 3, is a horizontal section taken in the plane of the dotted line 7 7 of Fig. 1—viz., through the lower section and looking downward.
Figure 7:
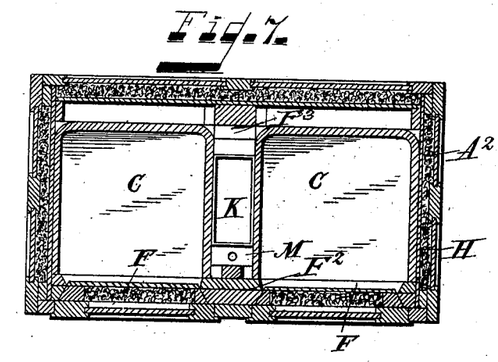
Fig. 7, Sheet 4, represents, on a diminished scale, a horizontal section taken in the plane of either of the dotted lines 8 8 of Fig. 1.
Figure 12:
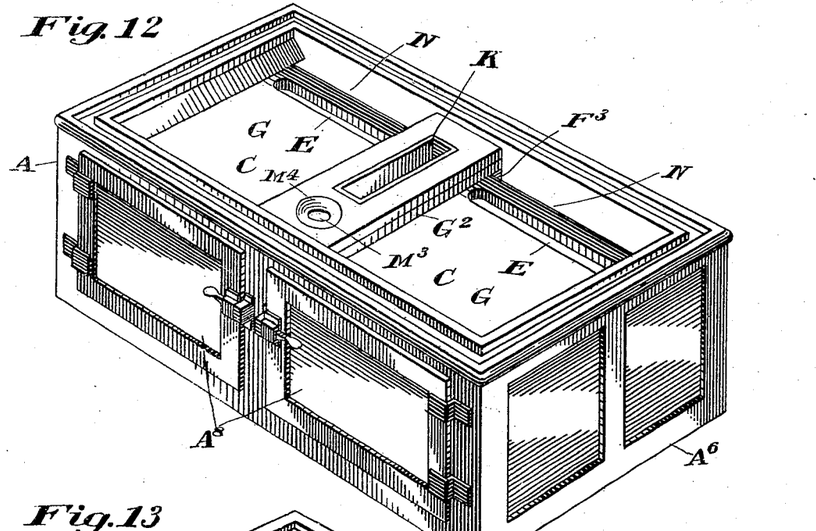
Fig. 12 is a perspective view showing the upper provision-section of the refrigerator detached.

When the space N is provided between the back walls of the casing and vitrified linings, it is desirable to provide it with a vertical central partition $F^3$, similar to the partition $F^2$ at the front of the casing. The partition $F^3$ is shown in Figs. 6, 7, and 12, and its function is to prevent the mingling of the air from opposite sides of the refrigerator, as would otherwise occur at the air-spaces G.

Figure 1:
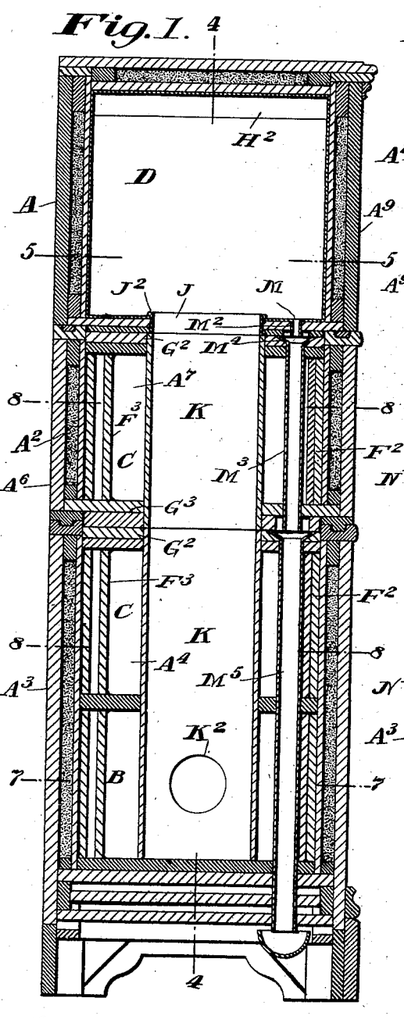
Figure 15:
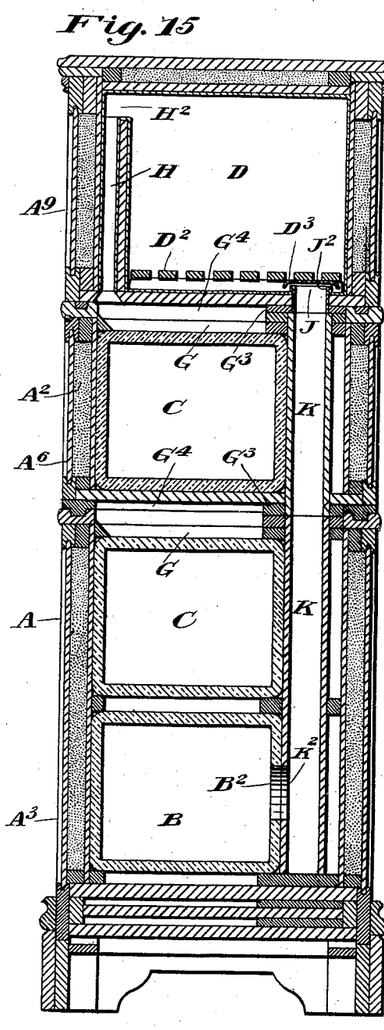
Fig. 15 is a sectional view similar to Fig. 3, but illustrating a modified form of the refrigerator, in which the provision-compartments are arranged in a single vertical series.

In some cases, where less capacity is desired, one set or tier of the provision-compartments and linings may be omitted. Such a construction is shown in Fig. 15. As shown in this view, the left-hand set or tier of compartments is omitted and the flue K for descending cold air extends down from the ice-chamber along one wall of the casing and discharges its cold air through an opening in the lower lining or crock B at the right-hand side of the casing. The circulation and construction are the same in this as in the construction illustrated in Fig. 1, except that the left-hand set of compartments being omitted the partitions for dividing the air during its circulation through the two sets of compartments are also omitted.

What I claim as new and of my invention, and desire to secure by Letters Patent, is—

1. A refrigerator-crock consisting of an earthenware receptacle B having a floor, roof, back, sides and open front, and having in its roof near the rear thereof an elongated opening E, extending crosswise of said crock, a ledge E² formed along the long edge of said opening nearest the front of the crock and inside of said crock, the said crock being also provided with a large opening B through the center of one of its sides, substantially as described.

2. A refrigerator-crock consisting of an earthenware receptacle B, having a floor, roof, back, sides and open front, and having in its roof and floor and near the rear thereof, the elongated openings E, extending crosswise of said crock, a ledge E² formed along the long edge of each of said openings nearest the front of said crock, the sides of said crock being completely closed, substantially as described.

3. A refrigerator comprising a body or casing having an ice-chamber and two sets or tiers each consisting of a plurality of superposed provision-compartments, the compartments of each tier or set being arranged at a lower level than the ice-chamber, means to carry cold air from the lower part of the ice-chamber down past the upper compartments of the tiers or sets and to discharge such cold air into the lowermost compartments thereof, and two flues for each set or tier of compartments, the flues of each set or tier being arranged for communication with opposite parts of each compartment of such tier or set and being adapted to circulate such cold air through the provision-compartments and to discharge the same into the upper part of the ice-chamber, substantially as described.

4. A refrigerator comprising a body or casing having an ice-chamber and a plurality of superposed provision-compartments at a lower level than the ice-chamber, means to carry cold air from the ice-chamber down past one or more of the provision-compartments and to discharge the same into the lowermost provision-compartment, and two flues arranged for communication with opposite parts of each of said superposed provision-compartments and adapted to circulate such cold air through the provision-compartments and to discharge the same into the upper part of the ice-chamber, substantially as and for the purposes specified.

5. A refrigerator comprising a body or casing having an ice-chamber and two sets or tiers each consisting of a plurality of superposed provision-compartments, the compartments of each tier or set being arranged at a lower level than the ice-chamber, and the tiers or sets of compartments being spaced away from each other, a flue extended from the lower part of the ice-chamber down through the space between the two tiers or sets of provision-compartments past the upper compartments and arranged to discharge cold air to the lowermost compartment of each tier or set, and means for circulating the air through the several superposed compartments and for returning the same to the upper part of the ice-chamber, substantially as described.

6. A refrigerator comprising a body or casing having an ice-chamber and two sets or tiers each consisting of a plurality of superposed provision-compartments, said tiers or sets being arranged side by side, means to carry cold air from the lower part of the ice-chamber down past the upper compartments of the tiers or sets and to discharge such cold air into the lowermost compartments thereof, said body having a space adapted for communication with each compartment and arranged to carry the air from the same to the upper part of the ice-chamber, and a vertical partition arranged across said space to divide it into two flues each having communication with the compartments of one tier or set, substantially as described.

7. A refrigerator comprising a body or casing having an ice-chamber and a plurality of superposed provision-compartments at a lower level than the ice-chamber and each provided with a lining having an open front and closed top, bottom, sides and back, the lining of the lowermost provision-compartment having an opening in its top and near its rear wall and the lining or linings of the upper provision compartment or compartments being provided with similarly-located openings in both top and bottom, the said openings being arranged to afford circulation of air upward through the provision-compartments from the lowermost compartment, means for supplying cold air from the lower part of the ice-chamber to the lowermost provision-compartment, and means to carry the air after being passed through said openings to the upper part of the ice-chamber, substantially as described.

8. A refrigerator comprising a body or casing having an ice-chamber and two sets or tiers each consisting of a plurality of superposed provision-compartments, the compartments of each tier or set being arranged at a lower level than the ice-chamber and being each provided with a lining having an open front and closed top, bottom, sides and back, the linings of the two lowermost compartments of the respective tiers or sets having each an opening in its top near its rear wall, and the lining or linings of the upper provision-compartments of each tier or set being provided with similarly-located openings in both top and bottom, the openings in the linings of each tier or set being arranged to afford circulation of air upward through the provision-compartments from the corresponding lowermost compartment, means for supplying cold air from the lower part of the ice-chamber to the lowermost provision-compartment of each tier or set and means to carry the air after being passed through the compartments of each set or tier to the upper part of the ice-chamber, substantially as described.

9. A crock or lining for a refrigerator-compartment consisting of a receptacle having an open front and provided with back, top, bottom and side walls, one of said walls being provided with an opening and having on its inner surface a bead or ledge raised above said surface and extended along the edge of said opening, substantially as set forth.

EDWARD H. GIESY.

Attest:
  A. S. LUDLOW,
  K. SMITH.